(12) United States Patent
Miura et al.

(10) Patent No.: US 6,839,188 B2
(45) Date of Patent: Jan. 4, 2005

(54) OPTICAL ELEMENT AND OPTICAL PICKUP

(75) Inventors: Takahiro Miura, Kanagawa (JP); Masahiro Yamada, Kanagawa (JP)

(73) Assignee: Sony Corporation (JP)

( * ) Notice: Subject to any disclaimer, the term of this patent is extended or adjusted under 35 U.S.C. 154(b) by 43 days.

(21) Appl. No.: 10/336,795

(22) Filed: Jan. 6, 2003

(65) Prior Publication Data

US 2003/0174415 A1 Sep. 18, 2003

(30) Foreign Application Priority Data

Jan. 11, 2002 (JP) ..................................... P2002-005272

(51) Int. Cl.[7] .......................... G02B 13/18; G02B 9/00; H04B 1/20
(52) U.S. Cl. ....................... 359/718; 359/719; 359/796; 369/11.23
(58) Field of Search .................................. 359/718, 719, 359/716, 717, 796, 642; 369/112.23, 112.24, 112.25, 112.26

(56) References Cited

U.S. PATENT DOCUMENTS 6,590,717 B2 * 7/2003 Sasano et al. .............. 359/717

2003/0026006 A1 * 2/2003 Kitamura et al. ........... 359/719

* cited by examiner

*Primary Examiner*—Georgia Epps
*Assistant Examiner*—Jack Dinh
(74) *Attorney, Agent, or Firm*—Rader, Fishman & Grauer PLLC; Ronald P. Kananen

(57) ABSTRACT

The system and methods of the present invention are directed to an optical pickup. The optical includes at least a light source, a lens for focusing and irradiating light from the light source on a recording medium, and an optical pickup element. The optical pickup element includes a lens base plate in which a lens made of a material having a high refractive index is embedded within a transparent base plate to pass incident light. The optical element further includes an aberration correction base plate formed of a transparent parallel flat plate-like base plate to pass light and correcting a comatic aberration produced on the lens. The lens base plate and the aberration correction base plate are integrated such that the lens base plate and the aberration correction base plate are parallel to each other. Moreover, the aberration correction base plate is located on the side of a point at which incident light is focused by the lens.. The optical element can reduce the diameter of the lens, increase the radius of curvature of the lens, and correct a comatic aberration produced when an optical axis of incident light is inclined relative to the lens.

8 Claims, 5 Drawing Sheets

OPTICAL ELEMENT AND OPTICAL PICKUP

BACKGROUND OF THE INVENTION

1. Field of the Invention

The present invention relates to an optical element including a lens base plate in which a lens of a high refractive index is embedded into a base plate and an optical pickup using this optical element.

2. Description of the Related Art

In recent years, micro-lenses are widely used in various fields, such as optical communication and an optical head of an optical pickup for use in recording and reproducing an information signal on and from an optical recording medium, e.g., optical disk. It is strongly requested that these micro-lenses should have a large NA (numerical aperture) and should be formed as aspherical micro-lenses.

In micro-lenses for use in optical communication, an optical pickup and the like, a sheet forming method using a mold has hitherto been used as a manufacturing method for mass-producing micro-lenses inexpensively.

When micro-lenses are used in the field of optical pickup and so on, there is an increasing demand of reducing a diameter of lens and increasing a radius of curvature of a lens to increase a numerical aperture of a lens.

However, in order to manufacture a lens with a small diameter and of which the radius of curvature is large, it becomes difficult to produce a mold for use in sheet forming.

For this reason, as a micro-lens manufacturing method, there have been proposed a photolithography technique and manufacturing methods proposed by the same assignee of the present application (see Japanese patent applications Nos. 2000-132897, 2000-189729, 2000-189730, 2000-305122, 2001-37366, 2001-51736).

However, according to these previously-proposed manufacturing methods, it is very difficult to make both surfaces of a lens become aspherical surfaces and it is also very difficult to increase a thickness of a lens from a technique standpoint.

As a result, lenses manufactured by these manufacturing methods are shaped like thin flat convex aspherical lenses, i.e. one major surface is shaped like an aspherical shape and another major surface is shaped like a flat surface.

In this lens shaped like the flat convex aspherical lens, if such lens is designed such that spherical aberration produced on the optical axis on the major surface side that is the aspherical surface may be corrected, there then arises a problem that an amount of comatic aberration produced when the optical axis of incident light is inclined relative to the lens will not be decreased at the same time. The reason for this is that, while the comatic aberration produced when the optical axis of the incident light is inclined can be corrected on the major surface that is the aspherical surface, the comatic aberration cannot be corrected on the major surface that is the flat surface and that the aspherical surface is optimized in order to correct the spherical aberration so that the comatic aberration cannot be corrected completely.

SUMMARY OF THE INVENTION

In view of the aforesaid aspect, it is an object of the present invention to provide an optical element in which a diameter of lens can be reduced, a radius of curvature of lens can be increased and a comatic aberration produced when an optical axis of incident light is inclined relative to a lens can be corrected.

Another object of the present invention is to provide an optical pickup using the above-mentioned optical element.

According to an aspect of the present invention, there is provided an optical element which is comprised of a lens base plate in which a lens made of a material having a refractive index higher than that of a transparent base plate to pass incident light is embedded into the transparent base plate and an aberration correction base plate formed of a transparent parallel flat plate-like base plate to pass light and correcting a comatic aberration produced on the lens, wherein the lens base plate and the aberration correction base plate are integrated such that the lens base plate and the aberration correction base plate are located in parallel to each other and that the aberration correction base plate is located on the side of a point at which incident light is focused by the lens.

In accordance with another aspect of the present invention, there is provided an optical pickup which is comprised of at least a light source, a lens for focusing and irradiating light from the light source onto a recording medium and an optical element, the optical element comprising a lens base plate in which a lens made of a material having a refractive index higher than that of a transparent base plate to pass incident light is embedded into the transparent base plate and an aberration correction base plate formed of a transparent parallel flat plate-like base plate to pass light and correcting a comatic aberration produced on the lens, wherein the lens base plate and the aberration correction base plate are integrated such that the lens base plate and the aberration correction base plate are located in parallel to each other and that the aberration correction base plate is located on the side of a point at which incident light is focused by the lens.

According to the arrangement of the above-mentioned optical element of the present invention, since the lens base plate and the aberration correction base plate are integrated such that the lens base plate and the aberration correction base plate are located in parallel to each other and that the aberration correction base plate is located on the side of a point at which incident light is focused by the lens, a comatic aberration produced on the lens when the optical axis of the incident light is inclined relative to the lens can be canceled out by a comatic aberration produced on the aberration correction base plate.

Consequently, it becomes possible to decrease a comatic aberration produced when the optical axis of incident light is inclined relative to the lens.

According to the arrangement of the above-mentioned optical pickup of the present invention, since the optical pickup includes the above-mentioned optical element of the present invention, a comatic aberration produced when the optical axis of the incident light is inclined relative to the lens can be decreased. Hence, it becomes possible to form spots of satisfactory shape on a recording medium by focusing incident light.

DESCRIPTION OF THE PREFERRED EMBODIMENTS

Figure 1:
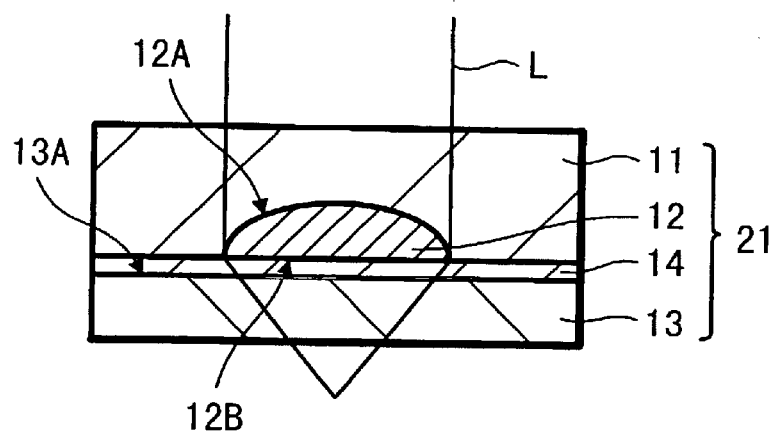
FIG. 1 is a schematic cross-sectional view showing an optical element according to an embodiment of the present invention.

Before describing the preferred embodiments of the invention, let us summarize the essence of the present invention in order to understand the present invention more clearly.

According to the present invention, there is provided an optical element which is comprised of a lens base plate in which a lens made of a material having a refractive index higher than that of a transparent base plate to pass incident light is embedded into the transparent base plate and an aberration correction base plate formed of a transparent parallel flat plate-like base plate to pass light and correcting a comatic aberration produced on the lens, wherein the lens base plate and the aberration correction base plate are integrated such that the lens base plate and the aberration correction base plate are located in parallel to each other and that the aberration correction base plate is located on the side of a point at which incident light is focused by the lens.

According to the present invention, there is provided the above-mentioned optical element in which the lens base plate and the parallel flat plate-like base plate are bonded and integrated by an adhesive layer.

According to the present invention, there is provided the above-mentioned optical element in which the lens base plate and the parallel flat plate-like base plate are located in parallel to each other and integrated by a position holding mechanism.

According to the present invention, there is provided the above-mentioned optical element in which the surface of the entrance side of the lens is shaped like an aspherical surface and the surface of the exit side of the lens is shaped like a flat surface.

According to the present invention, there is provided the above-mentioned optical element in which a refractive index and a thickness of the parallel flat plate-like base plate are selected so as to satisfy a first equation: $N>1.62$ and $n_B>n_A$ and a second equation: $0.35<n_A+n_C-n_B<1.0$ where $n_A$ represents the refractive index of the lens base plate, $n_B$ represents the refractive index of the lens, the lens effective refractive index N is assumed to be N $(n_B/n_A+n_B)/2$ and $n_C$ represents the refractive index obtained when respective layers from the principal point to the focal point of the lens are replaced with homogeneous mediums having the same thickness.

Further, there is provided an optical pickup which is comprised of at least a light source, a lens for focusing and irradiating light from the light source onto a recording medium and an optical element, the optical element comprising a lens base plate in which a lens made of a material having a refractive index higher than that of a transparent base plate to pass incident light is embedded into the transparent base plate and an aberration correction base plate formed of a transparent parallel flat plate-like base plate to pass light and correcting a comatic aberration produced on the lens, wherein the lens base plate and the aberration correction base plate are integrated such that the lens base plate and the aberration correction base plate are located in parallel to each other and that the aberration correction base plate is located on the side of a point at which incident light is focused by the lens.

According to the present invention, there is provided the optical pickup in which a slider using an optical element is located so as to oppose a recording medium.

According to the present invention, there is provided the optical pickup in which a space between the optical element and the recording medium is selected to be larger than 0.1 $\mu$m and smaller than 10 $\mu$m.

The present invention will now be described in detail with reference to the drawings.

FIG. 1 of the accompanying drawings is a schematic cross-sectional view showing an arrangement of an optical element according to an embodiment of the present invention.

As shown in FIG. 1, an optical element 21 includes a flat plate-like lens base plate 11 and a lens 12 made of a material having a refractive index higher than that of the lens base plate 11 and in which the lens 12 is embedded into the lens base plate 11. The lens base plate 11 and the lens 12 constitute a slid impregnation lens.

The lens base plate 11 and the lens 12 are both made of a transparent material that can pass propagating light beam L.

The lens base plate 11 is comprised of a dielectric base plate (e.g. glass, optical crystal, etc.).

In the lens 12, an entrance end face 12A for the light beam L is shaped like a convex aspherical end face and an exit end face 12B for the light beam L is shaped like a flat convex aspherical lens.

According to this embodiment, in particular, a parallel flat plate-like aberration correction base plate 13 is opposed to the lens base plate 11 at a point (image point) at which the light beam L is focused by the lens 12.

Then, the lens base plate 11 and the aberration correction base plate 13 are bonded by an adhesive layer 14 and thereby integrated to form the optical element 21.

Specifically, the lens base plate 11 and the aberration correction base plate 13 are bonded by the adhesive layer 14 in such a manner that a flat end face 12B of the lens 12 is used as a reference plane and an opposing flat end face 13A of the aberration correction base plate 13 and the reference plane 12B may become parallel to each other.

The aberration correction base plate 13 is comprised of a transparent base plate to pass the light beam L, e.g. dielectric base plate (glass, optical crystal, etc.).

This aberration correction base plate 13 may be made of either the same material as that of the lens base plate 11 or a material different from the lens base plate 11 (e.g. including materials having different compositions of glass).

The lens base plate 11 into which the lens 12 had been embedded can be manufactured by the previously-proposed manufacturing methods (see Japanese patent applications Nos. 2000-132897, 2000-189729, 2000-189730, 2000-305122, 2001-37366, 2001-51736).

In the optical element 21 according to this embodiment, coherent light L beam having a predetermined wavelength is collimated and the light beam L thus collimated is passed through the lens base plate 11 with the built-in lens 12 so that this light beam L is focused by the lens (flat convex aspherical lens) 12 and passed through the aberration correction base plate 13, whereafter it is focused.

Figure 2:
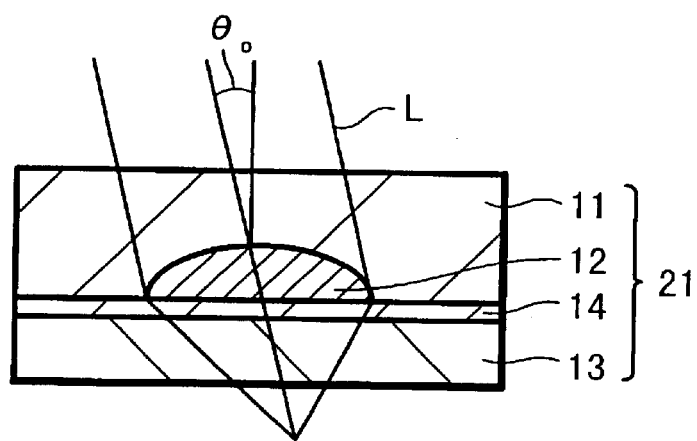
FIG. 2 is a schematic cross-sectional view to which reference will be made in explaining the manner in which the optical element shown in FIG. 1 is operated when light becomes incident on the optical element from the oblique direction.

The manner in which the optical element 21 according to this embodiment is operated when light becomes incident on this optical element 21 from the slanting direction will be described with reference to FIG. 2.

A comatic aberration observed at the point (image point) at which the light beam L is focused is expressed as a sum of a comatic aberration (first comatic aberration component) produced when the light beam L becomes incident on the lens 12 at an inclination $\theta_0$ and a comatic aberration (second comatic aberration component) produced when focused light from the lens 12 becomes incident on the aberration correction base plate (thickness $t_0$ and refractive index $n_0$) 13 at an inclination $\theta_0$.

An amount of the latter comatic aberration (second comatic aberration component) is calculated from Seidel's comatic aberration coefficient and becomes an amount proportional to the following equation (1). A polarity is determined by the angle of incidence $\theta_0$.

$$\text{coma aberration} = \alpha \frac{n_0^2 - 1}{2n_0^2} \cdot t_0 \cdot \theta_0 \cdot NA^3 / \lambda \quad (1)$$

When collimated light is introduced into a flat convex spherical lens generally made of a glass lens and in which the first surface is shaped as the spherical surface and the second surface is shaped as the flat surface, an amount of a comatic aberration produced at the lens is calculated from a comatic aberration coefficient of Seidel and becomes an amount proportional to the following equation (2):

$$\text{comma aberration} = \alpha \tan\theta_1 \cdot \frac{n_1^2 - n_1 - 1}{2n_1(n_1 - 1)} \quad (2)$$

where $n_1$ represents the refractive index of the lens and $\theta_1$ represents the angle of incidence at which the collimated light becomes incident on the lens.

A study of the equation (2) reveals that the polarity of the comatic aberration produced in this lens is inverted when the refractive index $n_1$ becomes approximately larger than 1.62.

When the collimated light is introduced into the flat convex aspherical lens in the same way as the lens 12 shown in FIG. 1, the equation (2) cannot be applied without modification.

However, when the refractive index of the lens 12 increases in excess of a certain value, the polarity of the comatic aberration (first comatic aberration component) produced at the lens 12 is inverted. The value of the refractive index at which this polarity of the comatic aberration is inverted differs depending upon the shape of the aspherical lens.

As described above, the polarity of the comatic aberration (first comatic aberration component) produced at the lens 12 is inverted and becomes opposite to that of the comatic aberration (second comatic aberration component) produced at the aberration correction base plate 13 expressed by the equation (1). Thus, by properly selecting the refractive index $n_0$ and the thickness $t_0$ of the aberration correction base plate 13, it becomes possible to cancel the first and second comatic aberration components each other out.

The effective refractive index N of the lens 12 is defined as the following equation (3):

$$N = (n_B/n_A + n_B)/2 \quad (3)$$

Since the light beam is introduced from the lens base plate 11 having the refractive index $n_A$ into the lens 12 having the refractive index $n_B$ and the light beam is emitted from the lens 12 having the refractive index $n_B$ into the air layer having a refractive index 1, changes ($n_B/n_A$ and $n_B/1$) of refractive indexes obtained when the light beam is introduced and emitted are averaged.

At that time, an equation of the refractive index of the lens 12 in which the comatic aberration (first comatic aberration component) produced at the lens 12 and the comatic aberration (second comatic aberration component) produced at the aberration correction base plate 13 become opposite to each other is approximately given by the following equation (4):

The first equation:

$$N > 1.65 \text{ and } n_B > n_A \quad (4)$$

When the first equation (4) is satisfied, by further adjusting the refractive index no and the thickness $t_0$ of the aberration correction base plate 13, it becomes possible to cancel the comatic aberration (first comatic aberration component) produced at the lens 12 by the comatic aberration (second comatic aberration component) produced at the aberration correction base plate 13.

Then, in the lens 12 that can satisfy the aforementioned first equation (4), if the second equation (5) which will follow is further satisfied at the same time, then it is possible to decrease the comatic aberration produced when the optical axis of the incident light is inclined relative to the lens 12.

The second equation:

$$0.35 < n_A - n_B + n_C < 1.0 \quad (5)$$

where $n_C$ represents the refractive index obtained when all layers containing the air layer inserted into a distance T from the principal point and the focal point of the lens 12.

The refractive index $n_C$ can be defined as in the following equations (6), (7) in the arrangement of the optical element 21 shown in FIG. 1, for example.

$$n_C \times T = n_B \times t_1 + n \text{ base plate} \times t \text{ base plate} + n \text{ air layer} \times t \text{ air layer} \quad (6)$$

The right-hand side of the equation (6) represents the sum total of the optical path lengths of the layers containing the air layers inserted from the principal point and the focal point (image point) of the lens 12, $t_1$ represents the thickness from the position of the principal point of the lens 12 embedded into the lens base plate 11 to the exit end face 12B of the lens 12, n base plate and t base plate have the refractive index and the thickness of the aberration correction base plate 13, and n air layer and t air layer have the refractive index and the thickness of the air layer between the aberration correction base plate 13 and the image point.

$$n_C = (n_B \times t_1 + n \text{ base plate} \times t \text{ base plate} + n \text{ air layer} \times t \text{ air layer})/T \quad (7)$$

Accordingly, when the flat convex aspherical lens such as the lens 12 shown in FIG. 1 in which the entrance end face 12A is formed as the aspherical surface and the exit end face 12B is formed as the flat surface is designed, first, desired values are set to the numerical aperture NA of the lens 12, the wavelength of the light beam L, the focal length of the lens 12 and the thickness of the lens 12, respectively. Further, in order to satisfy the first condition (4), the refractive indexes $n_A$ and $n_B$ of the lens base plate 11 and the lens 12 for desired wavelengths are determined, respectively.

According to the above-mentioned arrangement, since the refractive index $n_C$ becomes a value that is determined by a product of the refractive index and the thickness (n base plate×t base plate) of the aberration correction base plate 13, the refractive index (n base plate) and the thickness (t base plate) of the aberration correction base plate 13 are determined in such a manner the refractive index $n_C$ may satisfy the second equation (5).

Then, when the spherical aberration is corrected by the aspherical surface of the entrance end face 12A, there can be manufactured a lens in which a spherical aberration produced on the optical axis and a comatic aberration produced when the optical axis of the incident right is inclined relative to the lens 12 are small.

If the above-mentioned second equation (5) is not satisfied, then it becomes difficult to decrease the comatic aberration by canceling the comatic aberration produced at the lens 12 when the optical axis of the incident light is inclined relative to the lens with the aberration correction base plate 13.

Figure 3:
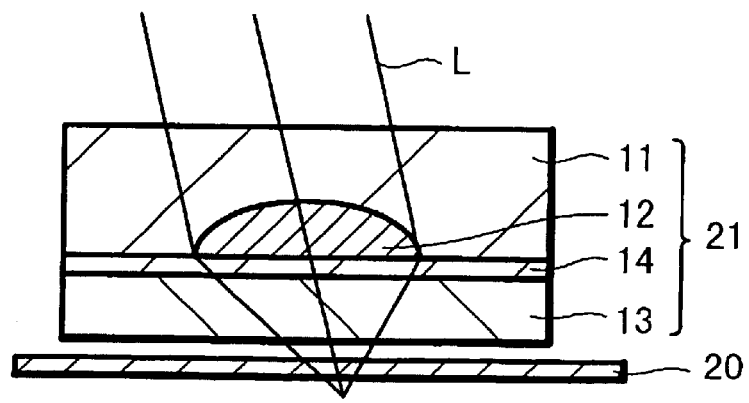
FIG. 3 is a schematic cross-sectional view showing an arrangement in which a dielectric base plate (or dielectric film) is added to the optical element shown in FIG. 1.

Next, let us consider the manner in which the optical element is operated when a dielectric base plate (or dielectric film) 20 for passing the light beam L is inserted between the exit end face and the focal point (image point) of the optical element 21 having the arrangement shown in FIG. 1, in addition to the aberration correction base plate 13, in such a manner that the dielectric base plate 20 becomes parallel to the aberration correction base plate 13 as shown in FIG. 3.

As specific examples of the dielectric base plate (or dielectric film), there may be enumerated a cover for preventing attachment of smudges and a coating film such as an antireflection film coated on the surface of an optical disk.

In this case, the comatic aberration observed at the focusing point (image point) is calculated as a sum of the comatic aberration (first comatic aberration component) produced when the light beam L is introduced into the lens 12 at the inclination $\theta_0$ and the comatic aberration (second comatic aberration component) produced when the focused light emitted from the lens 12 is introduced into the aberration correction base plate 13 and the dielectric base plate (or dielectric film) 20 at the inclination $\theta_0$.

Accordingly, the refractive indexes and the thicknesses of the aberration correction base plate 13 and the dielectric base plate (or dielectric film) 20 may be determined such that the sum of these comatic aberrations, i.e. the first and second comatic aberration components may become zero.

With respect to the equation of this case, the equation by which the refractive index $n_C$ is defined in the second equation (5) is modified as is given by the following equation (8). That is, the term of the dielectric base plate (or dielectric film) 20 may be added to the right-hand side of the aforementioned equation (6).

$$n_c \times T = \sum_{n=1}^{X} n_i \times t_i \quad (6)$$

where $n_i$ and $t_i$ represent refractive indexes and thicknesses of the aberration correction base plate 13, the air layer and the dielectric base plate (or dielectric film) inserted between the position of the principal point and the focal point (image point) of the lens 12, and x represents the number of mediums inserted between the position of the principal point and the position of the focal point of the lens 12.

Thus, the refractive index $n_C$ is expressed as:

$$n_c = \left\{ \sum_{n=1}^{X} n_i \times t_i \right\} / T \quad (9)$$

In the case of the arrangement shown in FIG. 3, if the thickness of the lens 12 and the material and the thickness of the dielectric base plate (or dielectric film) 20 are determined after the refractive indexes $n_A$, $n_B$ of the lens 12 relative to a desired wavelength had been set so as to satisfy the first equation (4), then since the refractive index $n_C$ becomes a value that is determined by a product (n base plate×t base plate) of the refractive index and thickness of the aberration correction base plate 13, the refractive index (n base plate) and thickness (t base plate) of the aberration correction base plate 13 are further determined so as to satisfy the second equation (5).

Then, when the spherical aberration is corrected by the aspherical surface of the entrance end face 12A of the lens 12, there can be manufactured a lens in which the spherical aberration produced on the optical axis and the comatic aberration produced when the optical axis of the incident light is inclined relative to the lens 12 can be decreased.

Figure 4:
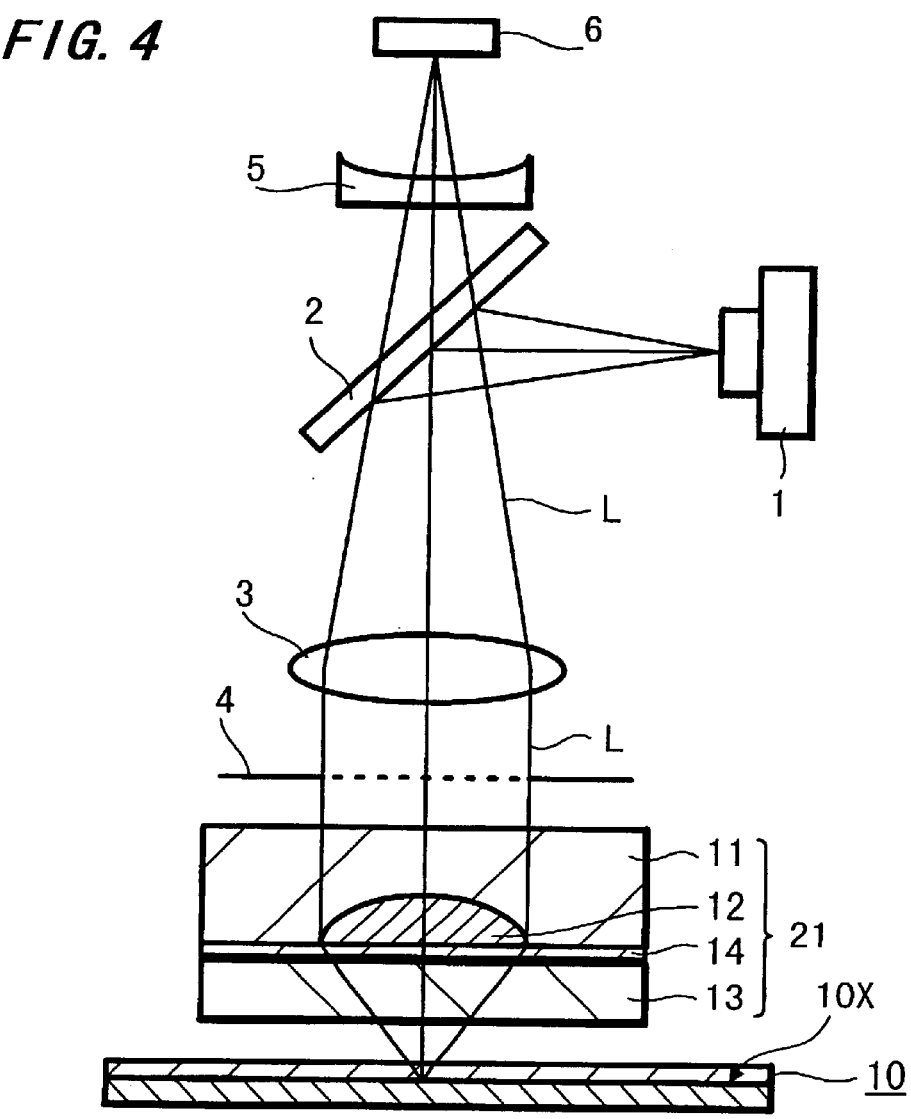
FIG. 4 is a schematic diagram showing an arrangement of a main portion of an optical pickup using the optical element shown in FIG. 1.

FIG. 4 is a schematic diagram showing an arrangement of a main portion of an optical pickup using the optical element 21 shown in FIG. 1.

The optical pickup shown in FIG. 4 comprises a semiconductor laser 1 for emitting laser light having a predetermined wavelength, a beam splitter 2, a collimator lens 3, a stop 4 and the optical element 21 shown in FIG. 1 that are located in a predetermined positional relationship so that laser light (light beam) L emitted from the semiconductor laser 1 may irradiate an irradiated portion, e.g. optical disk 10. An adjustment lens 5 and a photodetector 6 are located behind the beam splitter 2 as an arrangement that can detect laser light (light beam) L that had been modulated and reflected on the recording surface of the optical disk 10.

Operation of this optical pickup will be described below. The laser light L having the predetermined wavelength is emitted from the semiconductor laser 1. This laser light L is reflected by the beam splitter 2, collimated by the collimator lens 3, passed through the stop 4 and converged by an objective lens, i.e. the lens 12 within the optical element 21. Consequently, the laser light L is passed through a transmission dielectric base plate disposed within the optical disk 10 and thereby focused on a signal recording surface 10X of the optical disk 10.

The laser light L that had been modulated and reflected on this information recording surface 10X is introduced through the lens (objective lens) 12, the stop 4, the collimator lens 3, the beam splitter 2 and the adjustment lens 5 into the photodetector 6.

Figure 5:
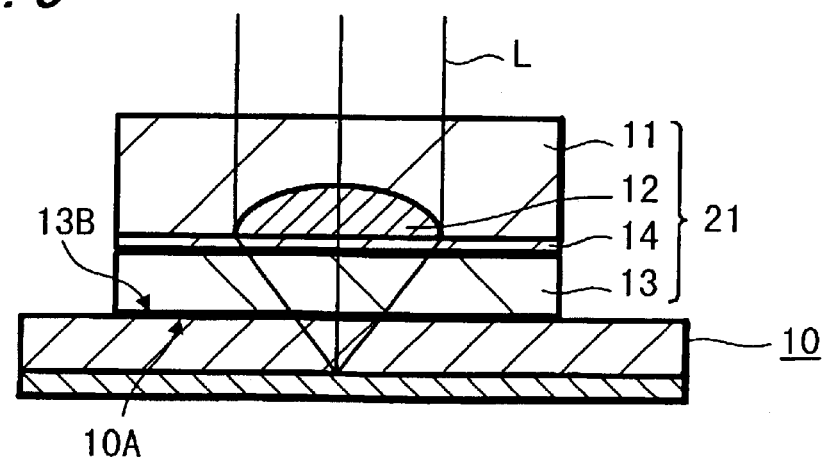
FIG. 5 is a schematic cross-sectional view showing an arrangement of a main portion other optical pickup using the optical element shown in FIG. 1.

FIG. 5 is a schematic cross-sectional view showing an arrangement of a main portion of another optical pickup using the optical element 21 shown in FIG. 1 wherein the optical element 21 shown in FIG. 1 is used as a slider.

The optical element 21 comprising the slider and the irradiated portion, e.g. the optical disk 10 are opposed to each other with a short distance.

In this case, a space between the exit end face (exit end face of the aberration correction base plate 13) 13B on the focal point (image point) of the optical element 21 and the face 10A on the lens 12 side of the transmission layer coated on the surface of the optical disk 10 should be kept constant within a range of greater than 0.1 $\mu$m and less than 10 $\mu$m.

To this end, since the refractive index $n_C$ that can satisfy the first and second equations (4), (5) becomes the value that is determined by the product (n base plate and t base plate) of the refractive index and thickness of the aberration correction base plate 13, the value of the thickness (t base plate) of the aberration correction base plate 13 should be determined such that the space between the exit end face 13B on the focal point side of the optical element 21 and the end face 10A on the lens side of the optical disk 10 should be kept constant within a range of greater than 0.1 $\mu$m and less than 10 $\mu$m. Then, the refractive index (n base plate) of the aberration correction base plate 13 may be determined in response to this thickness (t base plate).

Because the optical pickup shown in FIG. 4 and the optical pickup shown in FIG. 5 include the optical element 21 shown in FIG. 1, the comatic aberration produced at the lens 12 when the optical axis of the laser light L incident on the lens 12 is inclined can be decreased by the aberration correction base plate 13.

Figure 6:
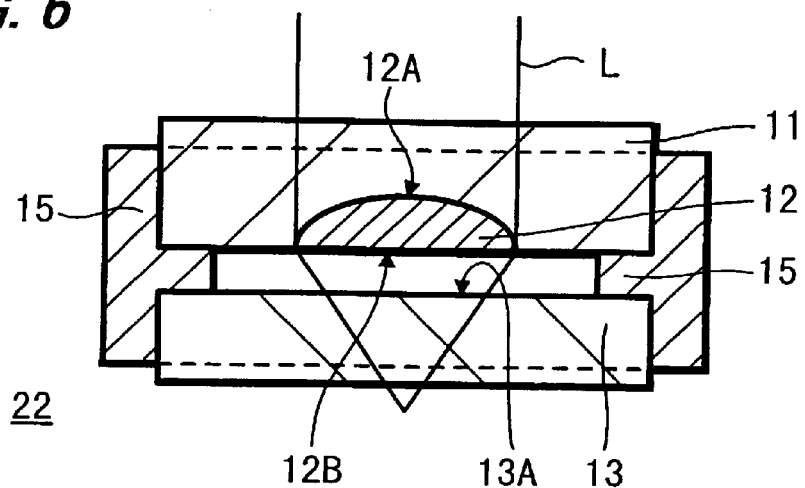
FIG. 6 is a schematic cross-sectional view showing an optical element according to another embodiment of the present invention.

FIG. 6 is a schematic cross-sectional view showing an arrangement of an optical element according to other embodiment of the present invention. An optical element 22 according to this embodiment has an arrangement obtained by partly modifying the arrangement of the optical element 21 shown in FIG. 1.

According to this embodiment, the lens base plate 11 and the parallel flat-plate like aberration correction base plate 13 are located by a position holding mechanism 15 such as a holding member in such a manner that the lens base plate 11 and the aberration correction base plate 13 may become parallel to each other.

By this position holding mechanism 15, the lens base plate 11 and the exit end face (flat surface) 12B on the focal point (image point) of the lens 12 and the entrance end face 13A on the lens 12 side of the aberration correction base plate 13 are located in parallel to each other.

According to the optical element 22 of this embodiment, since the flat surface 12B of the lens 12 can be used as a position reference plane for attaching the aberration correction base plate 13 to the optical element 22, the aberration correction base plate 13 can be attached to the optical element 22 by the use of the position holding mechanism 15 relatively easily in parallel at the desired space with high accuracy.

While the air layer is formed among the lens base plate 11, the lens 12 and the aberration correction base plate 13 as shown in FIG. 6, the present invention is not limited thereto and a transparent material (adhesive layer, glass layer, etc.) to pass the light beam L may be uniformly filled into this space.

The optical element 22 having this arrangement can construct the slider and an optical pickup having an arrangement similar to that shown in FIG. 5 can be constructed.

In that case, such optical pickup can be realized by locating the aberration correction base plate 13 with the position holding mechanism 15 in such a manner that the spacing between the aberration correction base plate 13 and the optical disk 10 may become equal to the aforementioned spacing (greater than 0.1 $\mu$m and less than 10 $\mu$m).

Figure 7:
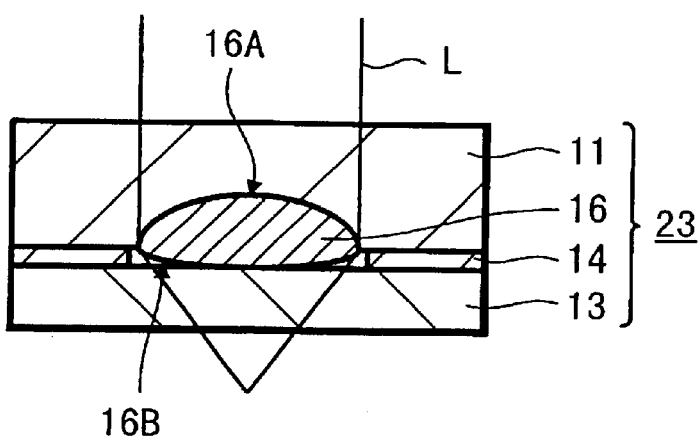
FIG. 7 is a schematic cross-sectional view showing an optical element according to other embodiment of the present invention.

FIG. 7 is a schematic cross-sectional view showing an arrangement of an optical element according to a further embodiment of the present invention.

In this embodiment, a shape of a lens 16 embedded into the lens base plate 11 differs from that of the lens 12 of the optical element 21 shown in FIG. 1.

Specifically, the lens 16 is formed as a convex lens wherein an entrance end face 16A of the light beam L is shaped like a convex aspherical surface and an exit end face 16B of the light beam L is shaped like a convex curved surface (spherical surface or aspherical surface).

Then, similarly to the optical element 21 shown in FIG. 1, the lens base plate 11 with the embedded lens 16 and the parallel flat plate-like aberration correction base plate 13 are bonded by the adhesive layer 14 and the lens base plate 11 and the aberration correction base plate 13 are thereby integrated to form an optical element 23.

However, according to this embodiment, since the lower surface of the lens 16 is formed as the convex surface and projected from the lower surface of the lens base plate 11, the adhesive layer 14 is not provided between the lens 16 and the aberration correction base plate 13.

Also in this case, coherent light beam having a predetermined wavelength is collimated and the collimated light beam L is passed through the lens base plate 11 with the embedded lens 16, whereafter this light beam L is converged by the lens (convex lens) 16 and passed through the aberration correction base plate 13 and then focused.

In the optical element 23 according to this embodiment, the comatic aberration produced at the entrance end face 16A of the lens 16 can be corrected slightly by the exit end face 16B that is shaped as the convex curved surface of the lens 16.

In consequence, freedom required by the design conditions of the aberration correction base plate 13 can increase as compared with the case in which the comatic aberration is corrected by only the aberration correction base plate 13.

Figure 8:
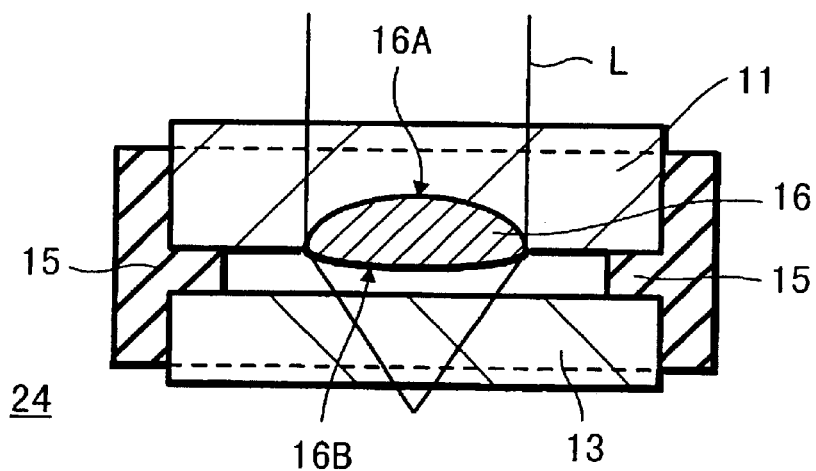
FIG. 8 is a schematic cross-sectional view showing an optical element according to a further embodiment of the present invention.

FIG. 8 is a schematic cross-sectional view showing an arrangement of an optical element according to yet a further embodiment of the present invention.

In this optical element 24, the lens (convex lens) 16 having an arrangement similar to that shown in FIG. 7 is embedded into the base plate 11 and the lens base plate 11 and the parallel flat plate-like aberration correction base plate 13 are fixed and integrated by the position holding mechanism 15 such as the holding member in such a manner that the base plate 11 and the aberration correction base plate 13 become parallel to each other.

According to this arrangement, the comatic aberration produced by the lens 16 can be similarly corrected by the aberration correction base plate 13.

The optical element 23 shown in FIG. 7 and the optical element 24 shown in FIG. 8 can be modified such that the exit end face of the lens base plate 11 is formed as a curved surface coincident with the lower surface 16B of the lens (convex lens) 16. In accordance with this arrangement, the exit end face can be formed as the curved surface after the lens 16 had been embedded into the lens base plate 11.

In this case, the entrance end face (flat surface) of the lens base plate 11 may be used as a reference plane by which the lens base plate 11 and the aberration correction base plate 13 can be located in parallel to each other.

According to the optical elements 21, 22, 23, 24 of the aforementioned embodiments, since the lens base plate 11 with the embedded lenses 12, 16 and the parallel flat plate-like correction base plate 13 are located in parallel to each other and thereby integrated, the comatic aberration (first comatic aberration component) produced at the lenses 12, 16 when the optical axis of the incident light is inclined relative to the lenses 12, 16 (laser light is introduced into the lenses 12, 16 in the oblique direction) can be canceled out by the comatic aberration (second comatic aberration component) produced at the parallel flat plate-like correction base plate 13.

The spherical aberration produced on the optical axis of the incident light can be corrected by the aspherical surfaces of the entrance end faces 12A, 16A of the lenses 12, 16.

As a consequence, the spherical aberration produced on the optical axis and the comatic aberration produced when the optical axis of the incident light is inclined relative to the lenses 12, 16 (laser light is introduced into the lenses 12, 16 from the oblique direction) can be decreased by the simple arrangement.

As shown in FIGS. 1, 6 and so forth, even when the lens 11 is formed as the thin flat convex aspherical lens, the spherical aberration produced on the optical axis and the comatic aberration produced when the optical axis of the incident light is inclined relative to the lens 12 can be decreased.

Since the thin flat convex aspherical lens is manufactured by the previously-proposed manufacturing methods and the like, even when the lens with the small diameter and whose radius of curvature is large is formed to cope with light having a short wavelength (e.g. 400 nm) or even when the numerical aperture NA of the lens is increased, the spherical aberration produced on the optical axis and the comatic aberration produced when the optical axis of the incident light is inclined can be decreased.

Then, since the optical pickups are constructed by the use of the optical elements 21, 22, 23, 24 of the aforesaid embodiments, the spherical aberration produced on the optical axis and the comatic aberration produced when the optical axis of the incident light is inclined relative to the lens can be decreased (made small) by the thin flat convex aspherical lens.

Thus, it becomes possible to form spots of satisfactory shape on the recording medium by focusing the incident light. Further, it becomes possible to increase the diameter of the objective lens and to decrease the radius of curvature of the lens so that the resultant lens can cope with light having a short wavelength. Furthermore, it becomes possible to increase the numerical aperture NA of the objective lens.

Accordingly, as the wavelength of the light beam L becomes shorter and the numerical aperture NA of the objective lens increases, it becomes possible to realize the optical pickup that is able to record and reproduce information on and from an optical recording medium having high recording density.

Further, when the optical pickups are constructed by using the optical elements 21, 22, 23, 24 according to the above-mentioned embodiments as the sliders, the spherical aberration produced on the optical axis and the comatic aberration produced when the optical axis of the incident light is inclined relative to the lens can be decreased. At the same time, a clearance between the exit end face of the optical elements 21, 22, 23, 24 and the optical recording medium such as the optical disk can be kept constant.

The above-mentioned space between the exit end face of the optical elements 21, 22, 23, 24 and the optical recording medium should preferably be kept constant within the above-mentioned range of from greater than 0.1 $\mu$m and less than 10 $\mu$m.

DESIGN EXAMPLE 1

Specific design examples of the optical elements according to the present invention will be described below.

Figure 9:
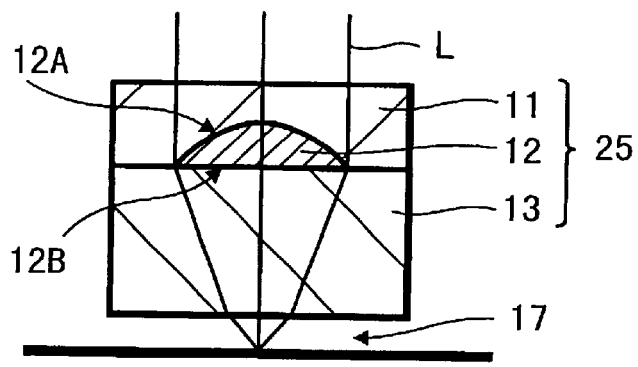
FIG. 9 is a schematic cross-sectional view showing an optical element according to the present invention.

There is prepared an optical element 25. FIG. 9 is a schematic cross-sectional view showing an arrangement of such optical element 25.

Specifically, there is prepared the optical element 25 in which the lens 12 serving as the flat convex aspherical lens whose entrance end face 12A is formed as the aspherical surface and of which the exit end face 12B is shaped as the flat surface similarly to the optical element 21 shown in FIG. 1 is embedded into the lens base plate 11 and in which the aberration correction base plate 13 is attached to the lens base plate 11.

In this optical element 25, the aberration correction base plate 13 is formed thick as compared with the lens base plate 11.

An air layer 17 is located on the image point side of the aberration correction base plate 13 of this optical element 25.

First, the numerical aperture NA of the lens 12 of the optical element 25 was set as NA=0.65, the wavelength of the light beam L was set to 655 nm, the focal length of the lens 12 was set to 0.38 mm, the thickness of the lens 12 was set to 0.12 mm, respectively.

Further, materials were selected such that the refractive indexes $n_A$, $n_B$ of the lens base plate 11 and the lens 12 may be given as $n_A$=1.485379 and $n_B$=2.2579 so as to satisfy the aforementioned first equation (4).

At that time, the distance $t_1$ from the principal point of the lens 12 to the exit end face 12B of the lens 12 was given as $t_1$=0.02169 mm.

Further, in order that the second equation (5) may be satisfied, n base plate=1.682604 and t base plate=0.40 were selected as the refractive index (n base plate) and the thickness (t base plate) of the aberration correction base plate 13, thereby resulting in $n_C$=1.5879. In this case, the thickness of the air layer 17 becomes 0.089127 mm.

At that time, the first and second equations (4), (5) are both satisfied as follows:

The first equation (4): N=1.89>1.62

The second equation (5): 0.35<$n_A$+$n_C$−$n_B$=0.815 <1.0

With respect to these design values, i.e. the lens base plate 11, the lens 12, the aberration correction base plate 13 and the air layer 17 of the optical element 25, examples of the design values of the thicknesses d (mm) and the refractive indexes n are tablulated on the following table 1. In the table 1, the thickness of the lens base plate 11 is the thickness at the central portion in which the lens 12 is embedded and the thickness of the outer peripheral portion in which the lens 12 is no embedded is given by a sum (0.22 mm) of the thickness of the lens 12.

TABLE 1

| Reference numerals | | d (mm) | n |
|---|---|---|---|
| 11 | Lens base plate | 0.1 | 1.485379 |
| 12 | Lens | 0.12 | 2.2579 |

TABLE 1-continued

| Reference numerals | | d (mm) | n |
|---|---|---|---|
| 13 | Aberration correction base plate | 0.4 | 1.682604 |
| 17 | Air layer | 0.089127 | (1.0) |

The following table 2 shows respective coefficients which show aspherical shapes of the entrance end face 12A of the lens 12.

In the table 12, r represents the radius of curvature, k represents the circular cone coefficient and A to D represent aspherical coefficients (reference letters following E represent exponent indications, i.e. x $10^n$) and are expressed by the following equation (10) when Z represents the coordinates in the optical axis direction (light traveling direction assumes the positive direction) and Y represents the coordinates of the optical axis and the vertical direction.

$$Z = \frac{Y^2/r}{1 + SQRT\{1 - (1+k)(Y/r)^2\}} + AY^4 + BY^6 + CY^8 + DY^{10} \quad (10)$$

TABLE 2

| Lens Aspherical Respective coefficients | R | 0.29356 |
|---|---|---|
| | K | −1.580094 |
| | A | 4.823350 |
| | B | −7.684740 |
| | C | 3.137190E+01 |
| | D | −2.382320E+02 |

Figure 10:
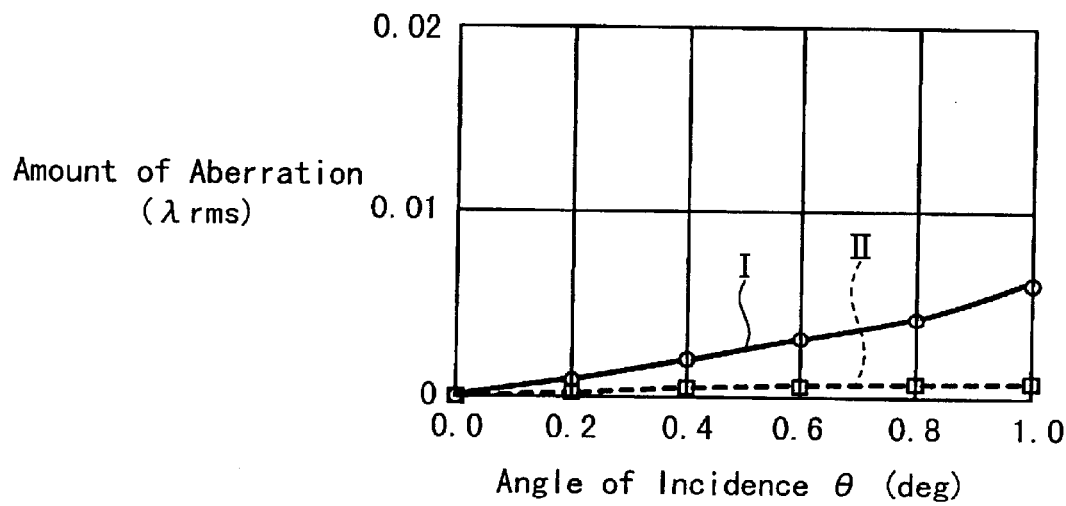
FIG. 10 is a graph showing a relationship between an angle of incidence and an amount of aberration in the optical element shown in FIG. 9.

FIG. 10 is a graph showing a relationship between an angle of incidence θ of light incident on the lens 12 and an amount of aberration of wavefront aberration and comatic aberration in the optical element 25 shown in FIG. 9.

Figure 11:
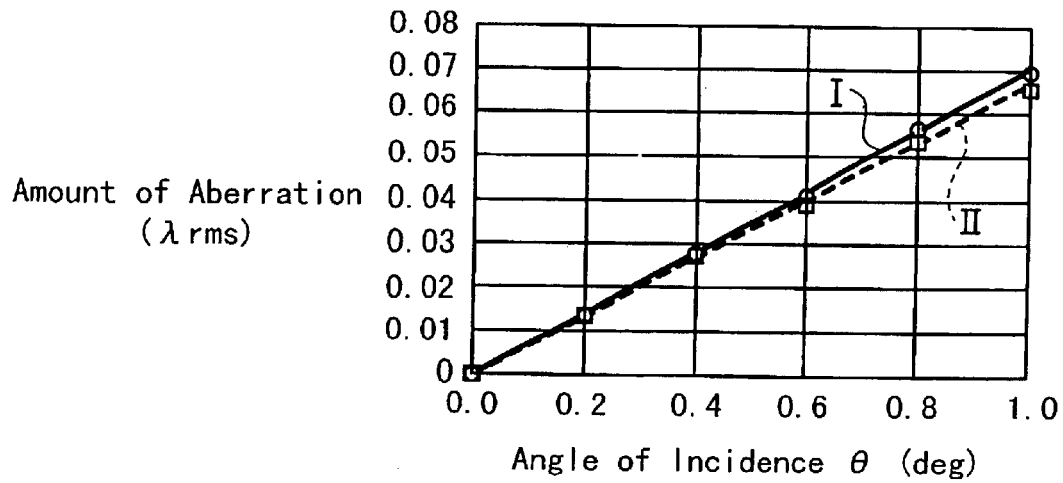
FIG. 11 is a graph showing a relationship between an amount of incident light and an amount of aberration in a related-art optical element that is not produced with an aberration correction base plate.

For comparison, FIG. 11 shows a relationship between an angle of incidence θ of light incident on the lens and an amount of aberration obtained in the case of the related-art optical element which does not include the aberration correction base plate 13.

In the graphs of FIGS. 10 and 11, a curve I (solid-line curve) shows measured results of wavefront aberration and a curve II (broken-line curve) shows measured results of comatic aberration.

Having compared the measured results in FIGS. 10 and 11, it is to be understood that the wavefront aberration can be decreased approximately to 1/10, the comatic aberration can be decreased approximately up to a very small fraction of the comatic aberration and that the wavefront aberration and the comatic aberration can both be decreased considerably.

DESIGN EXAMPLE 2

Figure 12:
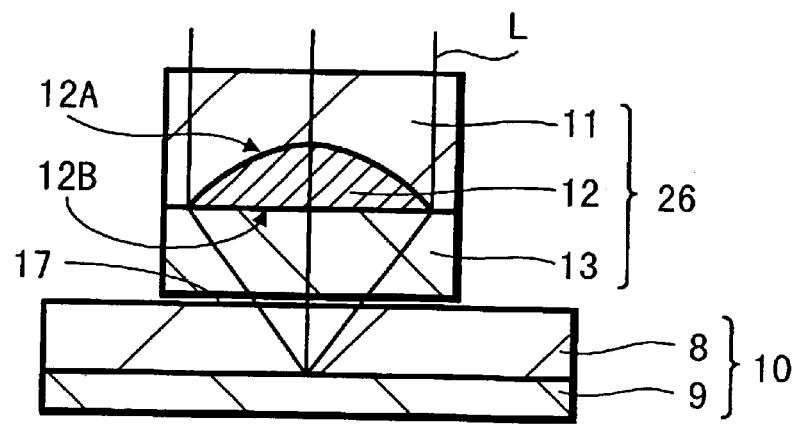
FIG. 12 is a schematic cross-sectional view showing an arrangement of an optical element according to the present invention.

There is prepared an optical element 26. FIG. 12 is a schematic cross-sectional view showing an arrangement of such optical element 26.

Specifically, there is prepared the optical element 26 in which the lens 12 serving as the flat convex aspherical lens whose entrance end face 12A is formed as the aspherical surface and of which the exit end face 12B is shaped as the flat surface similarly to the optical element 21 shown in FIG. 1 is embedded into the lens base plate 11 and in which the aberration correction base plate 13 is attached to the lens base plate 11.

In this optical element 26, the aberration correction base plate 13 is formed slightly thin as compared with the lens base plate 11.

This optical element 26 constructs the slider similarly to the arrangement shown in FIG. 5, and has the thin air layer 17 disposed between it and the image point side of the aberration correction base plate 13, i.e. an optical disk substrate 8 of the optical disk 10. In FIG. 12, reference numeral 12 collectively denotes respective layers such as a recording layer, a reflecting layer and a surface protecting layer formed on the optical disk substrate 8.

First, the numerical aperture NA of the lens 12 of the optical element 26 was set as NA=0.90, the wavelength of the light beam L was set to 400 nm, the focal length of the lens 12 was set to 0.20 mm, and the thickness of the lens 12 was set to 0.1 mm, respectively.

Further, materials were selected such that the refractive indexes $n_A$, $n_B$ of the lens base plate 11 and the lens 12 may be given as $n_A$=1.5308 and $n_B$=2.4657 so as to satisfy the aforementioned first equation (4).

At that time, the distance $t_1$ from the principal point of the lens 12 to the exit end face 12B of the lens 12 was given as $t_1$=0.01655 mm.

Further, in order that the second equation (5) may be satisfied, n base plate=1.5308 and t base plate=0.1483 were selected as the refractive index (n base plate) and the thickness (t base plate) of the aberration correction base plate 13. That is, in this design example, the aberration correction base plate 13 is made of the same material as that of the lens base plate 11 (refractive index is 1.5308).

Furthermore, the thickness of the air layer 17 was set to 0.001 mm (1 μm), the thickness of the optical disk substrate 8 of the optical disk 10 was set to 0.1 mm, and the refractive index was set to 1.62441, thereby resulting in $n_C$=1.62441.

At that time, the first and second equations (4), (5) are both satisfied as follows:

The first equation (4): N=2.01>1.62

The second equation (5): 0.35<$n_A$+$n_C$−$n_B$=0.737<1.0

With respect to these design values, i.e. the lens base plate 11, the lens 12, the aberration correction base plate 13 and the air layer 17 of the optical element 26 and the optical disk substrate 8, examples of the design values of the thicknesses d (mm) and the refractive indexes n are tablulated on the following table 3. In the table 3, the thickness of the lens base plate 11 is the thickness at the central portion in which the lens 12 is embedded and the thickness of the outer peripheral portion in which the lens 12 is not embedded is given by a sum (0.2 mm) of the thickness of the lens 12.

TABLE 3

| Reference Numeral | | d (mm) | n |
|---|---|---|---|
| 11 | Lens base Plate | 0.1 | 1.5308 |
| 12 | Lens | 0.1 | 2.4657 |
| 13 | Aberration correction base plate | 0.1483 | 1.5308 |
| 17 | Air layer | 0.001 | (1.0) |
| 8 | Optical disk substrate | 0.1 | 1.62441 |

The following table 4 shows respective coefficients which show aspherical shapes of the entrance end face 12A of the lens 12. Meanings of the respective coefficients in the table 4 are the same as those of the table 2.

TABLE 4

| Lens | r | 0.18697 |
|---|---|---|
| Aspherical | K | −1.880073 |
| Respective | A | 2.528720E+01 |
| coefficients | B | −1.754440E+02 |
|  | C | 2.802270E+03 |
|  | D | −2.607170E+04 |

Figure 13:
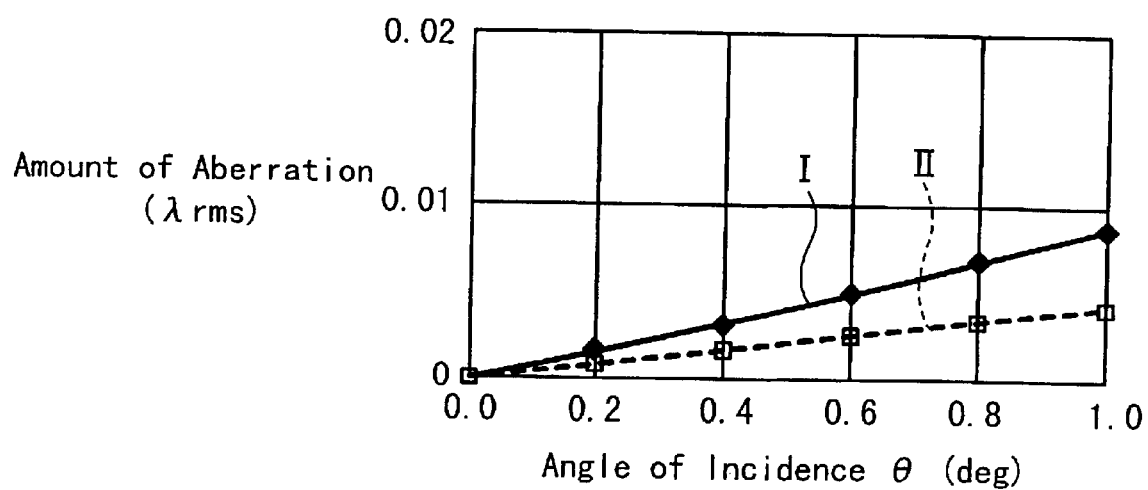
FIG. 13 is a graph showing a relationship between an amount of incident light and an amount of aberration in the optical element shown in FIG. 12.

FIG. 13 is a graph showing a relationship between an angle of incidence θ of light incident on the lens 12 and an amount of aberration of wavefront aberration and comatic aberration in the optical element 26 shown in FIG. 12.

In FIG. 13, a curve I (solid-line curve) shows measured result of wavefront aberration and a curve II (broken-line curve) shows measured results of comatic aberration.

A study of FIG. 13 reveals that the wavefront aberration and the comatic aberration can be decreased considerably as compared with the related-art optical element shown in FIG. 10.

Having considered the above-mentioned respective design examples, it is to be noted that the present invention can be applied to the optical element and the optical pickup regardless of wavelength of laser light, numerical aperture NA of lens and focal length of lens.

There can be considered such an arrangement in which two lenses are used and a comatic aberration produced on the first lens can be corrected by the aspherical surface of the second lens on the converging point (image point) instead of using the parallel flat plate-like base plate like the present invention.

However, according to the arrangement using the two lenses, since the two lenses should be aligned with high accuracy, it is unavoidable that a manufacturing cost will increase.

On the other hand, in the optical elements 21, 22, 23, 24 according to the aforementioned respective embodiments of the present invention, since the comatic aberration can be corrected by one lens 12 or 16 and the aberration correction base plate 13, the lens 12 or 16 and the aberration coefficient need not be aligned with high accuracy unlike the arrangement in which the two lenses are used to decrease the amount of the comatic aberration and hence the arrangement can be simplified. There is then an advantage that a manufacturing cost can be decreased.

The present invention can be applied to an arrangement using more than two lenses.

Then, in particular, in the arrangement using the two lenses, since a comatic aberration may be corrected by a combination of the second lens and the aberration correction parallel flat plate-like base plate with application of the present invention, a comatic aberration with respect to the second lens need not be corrected completely. In consequence, freedom for designing the second lens can increase and the second lens can be designed in order to optimize other characteristics.

According to the aforementioned optical element of the present invention, by the relatively simple arrangement in which the lens base plate with the embedded lens and the parallel flat plate-like base plate are located in parallel to each other and thereby integrated to form the optical element, it becomes possible to decrease the spherical aberration produced on the optical axis and the comatic aberration produced when the optical axis of the incident light is inclined relative to the lens.

In particular, even when the lens embedded into the lens base plate is the flat convex aspherical lens, the spherical aberration produced on the optical axis and the comatic aberration produced when the optical axis of the incident light is inclined relative to the lens can be decreased. Therefore, the inventive optical element can cope with laser light having a short wavelength and a numerical aperture NA of a lens can increase.

Therefore, when the optical pickup is constructed by the use of the optical element according to the present invention, it becomes possible to form spots of satisfactory shape on the recording medium by focusing the incident light. At the same time, since a wavelength of laser light can be reduced and a numerical aperture NA of an objective lens can be increased, it becomes possible to realize an optical pickup that is able to record and reproduce information on and from a recording medium having high recording density.

Furthermore, when the optical pickup is constructed by using the optical element according to the present invention as the slider, the space between the entrance end face of the optical element and the optical recording medium can be kept constant and can be kept constant within a range of from 0.1 μm to 10 μm.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical element comprising:
    a lens base plate in which a lens made of a material having a refractive index higher than that of a transparent base plate to pass incident light is embedded into said transparent base plate; and
    an aberration correction base plate formed of a transparent parallel flat plate-like base plate to pass light and correcting a comatic aberration produced on said lens, wherein said lens base plate and said aberration correction base plate are integrated such that said lens base plate and said aberration correction base plate are located in parallel to each other and that said aberration correction base plate is located on the side of a point at which incident light is focused by said lens.

2. An optical element according to claim 1, wherein said lens base plate and said aberration correction base plate are bonded and integrated by an adhesive layer.

3. An optical element according to claim 1, wherein said lens base plate and said aberration correction base plate are located in parallel to each other and integrated by a position holding mechanism.

4. An optical element according to claim 1, wherein said lens has an entrance end face which is shaped as an aspherical end face and said lens has an exit end face which is shaped as a flat end face.

5. An optical element according to claim 1, wherein a refractive index and a thickness of said aberration correction base plate are selected so as to satisfy:
    a first equation: $N > 1.62$ and $n_B > n_A$
    a second equation: $0.35 < n_A + n_C - n_B < 1.0$
where $n_A$ represents the refractive index of said lens base plate, $n_B$ represents the refractive index of said lens, an effective refractive index N of said lens is given as $N = (n_B/n_A + n_B)/2$ and $n_C$ represents the refractive index obtained when layers from a principal point to a focal point of said lens are replaced with homogeneous mediums having the same thickness.

6. An optical pickup comprising:

a light source;

a lens for focusing and irradiating light from said light source onto a recording medium; and an optical element, said optical element comprising:

a lens base plate in which a lens made of a material having a refractive index higher than that of a transparent base plate to pass incident light is embedded into said transparent base plate; and an aberration correction base plate formed of a transparent parallel flat plate-like base plate to pass light and correcting a comatic aberration produced on said lens, wherein said lens base plate and said aberration correction base plate are integrated such that said lens base plate and said aberration correction base plate are located in parallel to each other and that said aberration correction base plate is located on the side of a point at which incident light is focused by said lens.

7. An optical pickup according to claim 6, wherein said optical element forms a slider and said slider is located in an opposing relation to said recording medium.

8. An optical pickup according to claim 7, wherein said optical element and said recording medium have a space greater than 0.1 $\mu$m and less than 10 $\mu$m.

* * * * *

UNITED STATES PATENT AND TRADEMARK OFFICE
CERTIFICATE OF CORRECTION

PATENT NO. : 6,839,188 B2 Page 1 of 1
DATED : January 4, 2005
INVENTOR(S) : Takahiro Miura and Masahiro Yamada It is certified that error appears in the above-identified patent and that said Letters Patent is hereby corrected as shown below:

Title page,
Item [57], ABSTRACT,
Line 2, "optical" should read -- optical pickup --.
Line 16, "lens.." should read -- lens. --.

Signed and Sealed this

Twelfth Day of July, 2005

JON W. DUDAS
*Director of the United States Patent and Trademark Office*